United States Patent
Pfeilschifter

(10) Patent No.: US 11,396,238 B2
(45) Date of Patent: Jul. 26, 2022

(54) MOTOR VEHICLE ON-BOARD POWER SYSTEM FOR AN ELECTRICALLY DRIVEN VEHICLE, AND METHOD FOR OPERATING A MOTOR VEHICLE ON-BOARD POWER SYSTEM

(71) Applicant: CPT Group GmbH, Hannover (DE)

(72) Inventor: Franz Pfeilschifter, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 551 days.

(21) Appl. No.: 16/346,927

(22) PCT Filed: Nov. 7, 2017

(86) PCT No.: PCT/EP2017/078437
§ 371 (c)(1),
(2) Date: May 2, 2019

(87) PCT Pub. No.: WO2018/087073
PCT Pub. Date: May 17, 2018

(65) Prior Publication Data
US 2020/0055411 A1    Feb. 20, 2020

(30) Foreign Application Priority Data

Nov. 11, 2016  (DE) ...................... 10 2016 222 163.9

(51) Int. Cl.
*B60L 53/10*  (2019.01)
*B60L 53/14*  (2019.01)
(Continued)

(52) U.S. Cl.
CPC .............. *B60L 53/11* (2019.02); *B60L 53/14* (2019.02); *B60L 7/14* (2013.01); *B60L 53/24* (2019.02);
(Continued)

(58) Field of Classification Search
CPC .. B60L 53/11; B60L 53/14; B60L 7/14; B60L 53/24; B60L 2220/54;
(Continued)

(56) References Cited

U.S. PATENT DOCUMENTS 8,183,820 B2   5/2012  Anwar et al.
9,000,717 B2   4/2015  Januschevski et al.
(Continued)

FOREIGN PATENT DOCUMENTS

AT          510025 B1    1/2012
CN       101635529 A    1/2010
(Continued)

OTHER PUBLICATIONS

Korean Notice of Allowance for Korean Application No. 10-2019-7016587, dated May 24, 2021, wth translation, 3 pages.
(Continued)

*Primary Examiner* — Paul Dinh
(74) *Attorney, Agent, or Firm* — RatnerPrestia

(57) ABSTRACT

A motor vehicle on-board power system with a power converter, windings, an electric machine and a delta switch group is described. The electric machine is connected to the power converter, wherein a DC external connection is provided. The delta switch group connects the windings in a delta configuration. At least one switch of the delta switch group also connects at least one alternating current connection of the power converter to the DC external connection. A configuration controller actuates the delta switch group and has, on the one hand, the function of actuating the delta switch group in the closed state or open state within a driving state, according to a configuration specification. When energy is transmitted via the DC external connection, at least one switch of the delta switch group is actuated by
(Continued)

the configuration controller according to a closed switching state. In addition, an associated method is described.

12 Claims, 1 Drawing Sheet

(51) Int. Cl.
  *B60L 53/24* (2019.01)
  *B60L 7/14* (2006.01)
(52) U.S. Cl.
  CPC ..... *B60L 2220/54* (2013.01); *B60L 2240/421* (2013.01)
(58) Field of Classification Search
  CPC ............. B60L 2240/421; H02J 2207/40; H02J 2310/48; H02J 7/02; Y02T 10/64; Y02T 10/70; Y02T 10/7072; Y02T 10/92; Y02T 90/14; Y02T 90/12; B60Y 2200/91
  USPC ......................................................... 320/104
  See application file for complete search history.

(56) References Cited

U.S. PATENT DOCUMENTS

| | | | |
|---|---|---|---|
| 10,471,837 | B2 | 11/2019 | Herke et al. |
| 2004/0217723 | A1* | 11/2004 | Cai ..................... F02N 11/0866 318/268 |
| 2011/0234139 | A1* | 9/2011 | Hsu ........................ H02P 25/18 318/497 |
| 2011/0316461 | A1* | 12/2011 | Rippel ..................... H02P 6/14 318/400.29 |
| 2017/0229993 | A1* | 8/2017 | Obry ..................... H02P 25/188 |

FOREIGN PATENT DOCUMENTS

| | | |
|---|---|---|
| DE | 4107391 A1 | 9/1992 |
| DE | 102010054224 A1 | 2/2012 |
| DE | 102011075927 A1 | 11/2012 |
| EP | 2527186 A2 | 11/2012 |
| JP | 2011188601 A | 9/2011 |
| JP | 2011199974 A | 10/2011 |
| KR | 20160092933 A | 8/2016 |
| WO | 2011151131 A1 | 12/2011 |

OTHER PUBLICATIONS

Korean Notice to Submit Response for Korean Application No. 10-2019-7016587, dated Nov. 26, 2020, with translation, 5 pages.
English Translation of the Written Opinion for International Application No. PCT/EP2017/078437, dated Mar. 2, 2018—6 pages.
International Search Report and Written Opinion for International Application No. PCT/EP2017/078437, dated Mar. 2, 2018—8 pages.
Chinese Office Action for Chinese Application No. 201780070082. 9, dated Nov. 3, 2021, with translation, 13 pages.
Chinese Office Action for Chinese Application No. 201780070082. 9, dated Mar. 11, 2022, with translation, 17 pages.

* cited by examiner

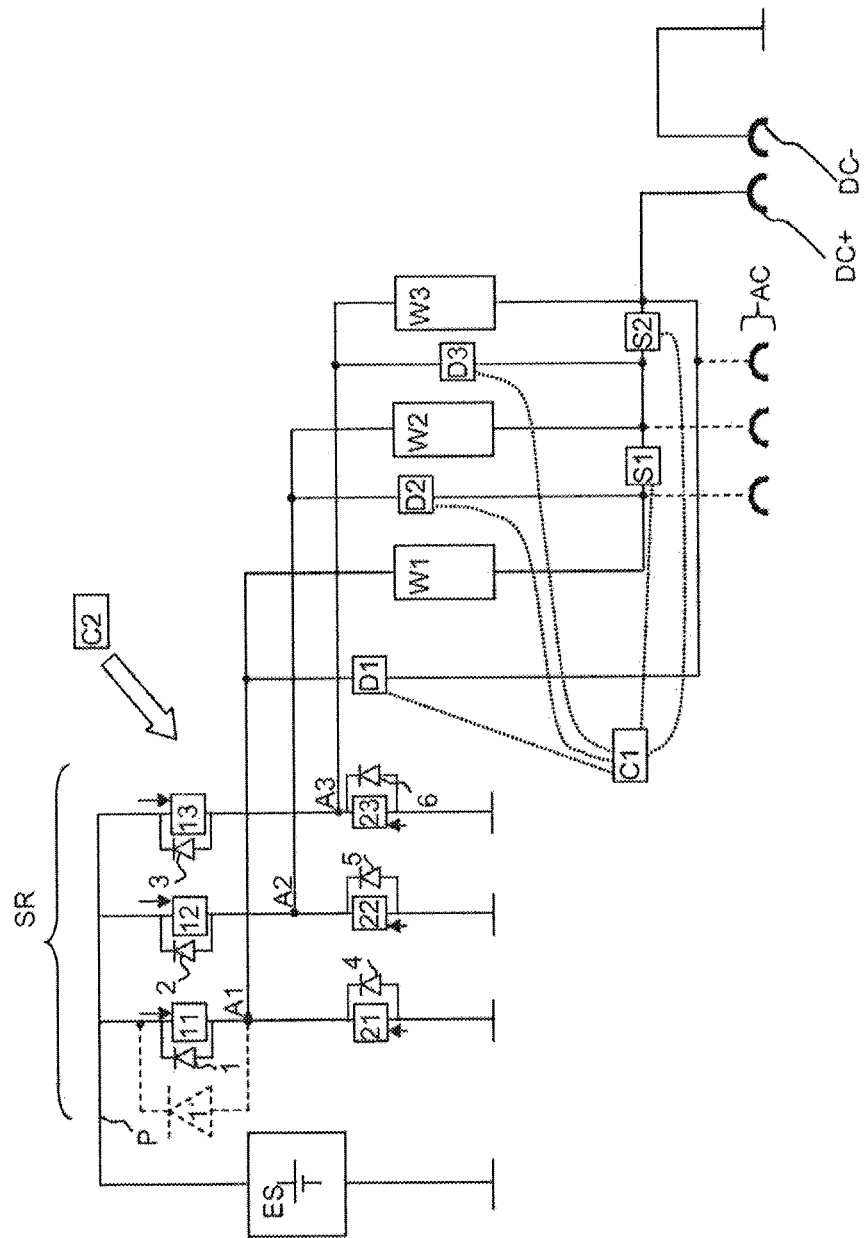

MOTOR VEHICLE ON-BOARD POWER SYSTEM FOR AN ELECTRICALLY DRIVEN VEHICLE, AND METHOD FOR OPERATING A MOTOR VEHICLE ON-BOARD POWER SYSTEM

CROSS REFERENCE TO RELATED APPLICATIONS

This application is the U.S. National Phase Application of PCT International Application No. PCT/EP2017/078437, filed Nov. 7, 2017, which claims priority to German Patent Application No. 10 2016 222 163.9, filed Nov. 11, 2016, the contents of such applications being incorporated by reference herein.

BACKGROUND OF THE INVENTION

It is known to drive motor vehicles by means of a battery as an energy store, wherein the electric drive comprises an electric machine. On the one hand, in order to generate a rotating field and generally to control the electric machine, semiconductors are required, in particular the semiconductor switches of a power converter, in order to be able to operate the electric machine by means of the direct voltage of the energy store.

Furthermore, it is generally known that vehicles with an electric energy store, which serves, in particular, to provide traction, can be charged via a charging interface on the exterior of the vehicle ("plug-in"), wherein this interface can also be used to feed back electrical energy from the vehicle to a stationary unit. For this transmission of energy, controlling elements are also necessary, which are also embodied, in particular, as semiconductor elements.

SUMMARY OF THE INVENTION

Since, in particular in the case of relatively high power levels of several kilowatts, the required power semiconductors can entail considerable costs, an aspect of the invention is a possible way of implementing an electric drive of a vehicle and the associated vehicle on-board power system in a cost-efficient fashion.

It is proposed to connect an energy store of a motor vehicle on-board power system with a DC external connection via at least one switch, which is also used to select a delta configuration of the windings of the electric machine of the drive. As result, in particular the windings of the electric machine can be bypassed by one or more switches of a delta switch group, with the result that a DC external connection can transmit energy directly into an energy storage unit via the power converter or via one or more switches thereof, which energy storage unit is connected to the electric machine via the power converter. As result, at least one switch of the delta switch group (which can be used to implement a delta configuration of the electric machine) can be used for two functions, specifically for generating the delta configuration and for conducting energy between an energy storage unit and a DC external connection. Since energy is transmitted via the DC external connection only when the vehicle is not travelling, the two functions do not adversely affect each other even though at least one switch element is used for both functions. In particular, no additional switch is necessary for transmitting energy via the DC external connection which is closed to transmit energy and is otherwise actuated in the open state.

A motor vehicle on-board power system is equipped with a power converter, windings of an electric machine and a delta switch group. The electric machine is connected to the power converter, wherein a DC external connection is provided. The delta switch group connects the windings in a delta configuration. At least one switch of the delta switch group also connects at least one alternating current connection of the power converter to the DC external connection. A configuration controller actuates the delta switch group and has, on the one hand, the function of actuating the delta switch group in the closed state or open state within a driving state, according to a configuration specification. When energy is transmitted via the DC external connection, at least one switch of the delta switch group is actuated by the configuration controller according to a closed switch state. In addition, an associated method is described.

A motor vehicle on-board power system is described which comprises a power converter, an electric machine, a delta switch group and a DC external connection. The power converter is equipped with a ground connection or with a ground potential which is connected to the DC external connection, in particular to the ground connection thereof. The electric machine has windings which are connected to the power converter. In particular, the electric machine is connected to alternating current connections of the power converter. The power converter is preferably an inverter and can be configured as a unidirectional or bidirectional inverter. The delta switch group connects the windings in a delta configuration. When the switch group is closed, the windings are connected in a delta configuration. When the switch group is open, the windings are not connected in a delta configuration. In the case of a delta configuration, the windings form a closed circuit; in this case the windings are connected in series, wherein the ends of the series circuit are connected to one another (as result of which the series circuit is closed).

The DC external connection is also connected to at least one of the alternating current connections (of the power converter) via at least one switch of the delta switch group. In other words, at least one switch of the delta switch group connects the DC external connection (in particular the positive terminal thereof) to the power converter. The alternating current connections are on the side of the power converter at which alternating current can be output, wherein the power converter also has a direct current side. In particular an energy storage unit is connected to said side. The DC external connection is therefore connected to the ground as well as to the power converter or to one of its alternating current connections via at least one switch. In this context, this connection can be provided via a switch of the delta switch group, via two switches of the delta switch group or via all the switches of the delta switch group.

The vehicle on-board power system also has a configuration controller which is connected in an actuating fashion to the delta switch group. In particular, the configuration controller is connected in an individually actuating fashion to each of the switches of the delta switch group. The configuration controller is configured to actuate the delta switch group in the closed state or open state according to a configuration device when the vehicle on-board power system is in a driving state. In addition, the configuration controller is configured to actuate the at least one switch of the delta switch group in the closed state when energy is transmitted via the DC external connection. The at least one switch is in this context that at least one switch which connects the DC external connection to at least one of the alternating current connections of the power converter.

The configuration controller can have a configuration input at which a signal which indicates a setpoint configuration can be received. The configuration relates here to the configuration of the windings. The signal represents the configuration and represents, in particular, that a delta configuration is to be set, that a delta configuration is to be opened (that is to say that the delta switch group is to be partially or completely opened) or can specify that there is to be a star configuration in which one end of each winding is connected to a measured star point, or represent that a star configuration is to be dissolved (when at least one winding or all the windings are not connected to the star point). The configuration specification can, in particular, also take the form that at least one switch of the delta switch group is to be closed in order to place the on-board power system in a state in which energy can be transmitted from the DC external connection to the power converter via the delta switch group. The last-mentioned configuration corresponds to a state of charge. The configuration which is to be set can therefore be a configuration which is suitable for a driving state, i.e. a star configuration or a delta configuration, and can also be a configuration which is suitable for charging and in which at least one switch of the delta switch group is closed in order to be able to transmit energy between the DC external connection, on the one hand, and the power converter or the energy storage unit, on the other hand (via the at least one switch).

A star switch group can be provided which connects the windings to a common star point (via individual switches). This star switch group is also connected to the configuration controller. In other words, the configuration controller is also connected in an actuating fashion to the star switch group. According to the configuration specification, the configuration controller is configured to actuate either the delta switch group in the closed state and the star switch group in the open state or the delta switch group in the open state and the star switch group in the closed state. In the driving state, the delta switch group and the star switch group are opened or closed alternately. It is possible to provide a superordinate controller which actuates the configuration controller (preferably directly) and the power converter (preferably via a power converter controller of the on-board power system or also directly).

The on-board power system preferably has a power converter controller. This can be part of the power converter or not part of the power converter but rather part of the on-board power system. In particular, the power converter controller and the configuration controller can be embodied as one integral unit, preferably together with the superordinate controller. The power converter controller is connected in an actuating fashion to switches of the power converter. The power converter forms, in particular, a B6C bridge or another full wave bridge circuit, wherein the switches are the individual switches of the bridge. The power converter controller can be configured to actuate the switches of the power converter to generate a rotating field in the windings when the vehicle on-board power system is in the driving state. In particular, when the configuration controller actuates the respective switch group according to a star configuration or according to a delta configuration, the switches of the power converter generate a rotating current which is converted into a magnetic rotating field in the windings. The power converter controller is configured, given a corresponding configuration specification or given a corresponding signal of a superordinate controller, to actuate the switches of the power converter to generate a rotating current or a rotating field in the windings.

The power converter controller is also configured to actuate all the switches of the power converter in the open state when energy is transmitted via the DC external connection. In this context, the power converter controller can comprise an input at which a signal which represents the state (driving state or configuration state or energy transmission state) can be received.

In this context, the one superordinate controller can be configured to detect whether the on-board power system is charged or fed back via the DC external connection, wherein the power converter controller is also configured to actuate all the switches of the power converter in the open state when energy is transmitted (that is to say during charging or during feeding back).

The term "actuate in the closed state" denotes the state in which the respective switches are actuated according to a closed state. The term "actuate in the open state" denotes the state in which the respective switches are actuated according to an opened switch state.

The switches are, in particular, semiconductor switches, for example transistors, preferably MOSFET transistors and, in particular, bipolar transistors with an insulated gate (IGBTs). The switches are power switches. The controller can be implemented by means of a programmable processor, for example by means of a microprocessor and associated memory and/or by means of an ASIC, wherein if appropriate further components (drivers, amplifiers, sensors . . . ) are used for the implementation.

The on-board power system can also have an AC external connection. The latter is connected via the windings to the alternating current connections of the power converter. The configuration controller is configured to actuate the delta switch group in the open state when energy is transmitted via the AC external connection. The configuration controller is configured to actuate the star switch group (if one is present) in the open state when energy is transmitted via the AC external connection. The configuration controller is configured to actuate no switch, one switch or a plurality of switches, in particular all the switches of the star switch group, in the closed state, when energy is transmitted via the DC connection. The star switch group is connected to those ends of the windings which are opposite the ends which are connected (directly) to the power converter. In other words, the star switch group and the power converter are located on opposite sides of the windings.

The on-board power system also preferably has an energy storage unit. The latter is connected to the ground connection and to a DC supply potential of the power converter. In other words, the energy storage unit is connected to a direct current side of the power converter. The power converter is designed here to transmit energy in a converting fashion between the direct current side and the alternating current side. The power converter is designed to transmit energy in a converting fashion between the ground connection and the DC supply potential, on the one hand, and the alternating current connections, on the other.

The switches of the power converter are preferably semiconductor switches, as described above. The switches of the switch groups are likewise preferably semiconductor switches such as are described above, but can also be electromechanical switches or can be implemented by means of thyristors or TRIACs.

The energy storage unit comprises, in particular, a traction battery and/or is configured to supply the electrical energy as a traction machine of the vehicle. In addition, the electric machine can be another electric drive of the vehicle, for example a drive of an electric air-conditioning compressor or of a starter generator. The energy storage unit comprises, in particular, a series connection of galvanic cells, preferably of secondary cells, in particular lithium-based accumulator cells. The energy storage unit can comprise, in particular, a lithium accumulator which is preferably connected (without further conversion and therefore directly) to the power converter, or which is connected to the power converter via a DC/DC converter (of the energy storage unit).

The abbreviations DC and AC are respectively used here for direct current and alternating current, as is generally known. The electric machine is preferably an asynchronous motor, but can also correspond to another type of electric machine. The electric machine can comprise a plurality of groups of the specified windings, wherein at least one group of the windings is connected as described here, in particular by means of a delta switch group which is actuated by a configuration controller, as is described here.

The AC external connections and the DC external connections can also be secured connections and/or comprise an EMC filter.

In addition, a method for operating a motor vehicle on-board power system is described. Here, the motor vehicle on-board power system preferably corresponds to the motor vehicle on-board power system described above. A method for operating a motor vehicle on-board power system which comprises windings of an electric machine, an energy storage unit and a power converter which connects the latter to one another, is described. In this context, the windings, the electric machine, the energy storage unit and/or the power converter are implemented as represented above.

In a driving state of the on-board power system (or of the motor vehicle), the windings of the electric machine are arranged in a delta configuration. This purpose, in particular the delta switch group, is used in order to produce the delta configuration. In this context, the delta switch group is preferably correspondingly actuated by the configuration controller in order to form the delta configuration of the windings.

In a DC energy transmission state, electrical energy is transmitted between the DC external connection and the energy storage unit. Here, the DC external connection preferably corresponds to the DC external connection described above. In particular, in the DC energy transmission state the energy is transmitted via at least one switch of the delta switch group (and preferably also via the power converter). As result of the fact that in the DC energy transmission state energy is transmitted via the delta switch group, and a current flows via the delta switch group even in the driving state (in particular in order to generate a rotating field), at least one switch of the delta switch group is utilized by both functions or used in both states. The term driving state describes a state in which the motor vehicle is driving or is ready to drive and, in particular, accelerates, drives without acceleration or brakes, preferably by recuperation. The DC energy transmission state excludes the driving state. In the same way, the driving state also excludes the DC energy transmission state. This also applies to an AC energy transmission state.

In the driving state of the on-board power system, the windings of the electric machine are either operated in delta configurations (preferably by means of the delta switch group) or are operated in a star configuration (in particular by means of a star switch group).

In the DC energy transmission state, electrical energy is transmitted between the DC external connection and the energy storage unit via at least one switch of the delta switch group. In addition there can be provision that in this context energy is transmitted via at least one switch of the star switch group (and also via at least one switch of the delta switch group). In addition, there is provision that in this context electrical energy is transmitted via the power converter, wherein in this context energy is not transmitted via the entire power converter but preferably only via one or more, but not via all, the switches of the power converter. For example, in this context energy is transmitted via an inverse diode of a switch or via a plurality of inverse diodes of a plurality of switches of the power converter. Instead of or in combination with inverse diodes, diodes which are connected in an antiparallel arrangement with respect to the switch of the power converter can also be used. An inverse diode is a diode which is formed by the semiconductor structure and which also forms a (semiconductor) switch. A connected diode is, in particular, embodied as a physically independent component, in particular as a discrete component, which has its own connections and/or its own housing.

There can be provision that in the energy transmission state electrical energy is transmitted by means of a current which is above the maximum switching current of the power converter. The maximum switching current of the power converter arises from the dimensioning of the switches or the power converter and is linked to the configuration of the power converter. Since the power converter does not have to generate an alternating field during the energy transmission state, its switches do not have to be switched either, with the result that the maximum switching current does not function as the upper limit for the transmission of energy, but rather the maximum permissible continuous current which can be transmitted via the switches of the power converter or via the power converter. The current by means of which the electrical energy is transmitted is preferably at least 10%, at least 15% or at least 20% or 30% and, in particular, at least 50% above the maximum switching current of the power converter or above the maximum switching current of the switches of the power converter.

In the energy transmission state, all the switches of the power converter are opened. If the power converter comprises a multi-phased full bridge, preferably both switches of each bridge branch are in the open state. The energy is transmitted here (in the form of a current) via at least one inverse diode of a switch of the power converter or via at least one diode which is connected in an antiparallel arrangement with respect to the switch. The energy can therefore be transmitted via an inverse diode of a switch of or via diode which is connected in an antiparallel arrangement with respect to the switch, or via both. Alternatively, the energy can be transmitted via the inverse diodes of a multiplicity of switches, or via the diodes which are each connected in an antiparallel arrangement with respect to a switch, or both.

In the driving mode, the electric machine can be operated in a star configuration or in a delta configuration depending on an up-to-date torque request and/or depending on a rotational speed request or depending on an actual rotational speed. When the electric machine is operating according to a setpoint torque which is above a predetermined torque threshold value, wherein the operation also provides that operation occurs according to a setpoint rotational speed which is below a predetermined rotational speed threshold value, the windings of the electric machine are operated in a star configuration. In other words, the electric machine is operated in a star configuration when the vehicle is in a starting phase which is linked, in particular, to a rotational speed which is below a rotational speed threshold value.

When the electric machine is operated according to a setpoint rotational speed above the rotational speed threshold value, the windings of the electric machine are operated in a delta configuration. In this context, the windings are operated by means of the star switch group in a star configuration or are operated by means of the delta switch group in a delta configuration.

In addition, an AC energy transmission state can be provided. In this state, electrical energy is transmitted between an AC external connection and the energy storage unit via the windings of the electric machine and via the power converter. In this context, the power converter converts the type of current. In the AC energy transmission state, a star switch group, which is configured to connect the windings in a star configuration, is opened. In addition, the delta switch group is preferably opened. The AC external connection corresponds, in particular, to the AC external connection mentioned above. The term external connection refers to connections which are provided in an outer skin of a vehicle. Contact can be made with external connections from a location outside the vehicle. External connections are preferably plug-type connections, for example according to a standard such as CHAdeMO (ISO 51851-23 and -24) or CCS (IEC 60309) or IEC 62196 or SAE J1772, these standards are incorporated by reference herein.

BRIEF DESCRIPTION OF THE DRAWINGS

The FIGURE serves to provide a more detailed explanation of the on-board power system described here and of the method described here.

DETAILED DESCRIPTION OF THE PREFERRED EMBODIMENTS

The FIGURE shows an exemplary motor vehicle on-board power system with an energy store ES, a power converter SR, windings W1 to W3 of an electric machine and with a DC external connection which is represented by the positive connection DC+ and by the negative connection DC−. The windings W1 to W3 are connected to the energy storage unit ES via the power converter SR. The DC external connection, in particular the positive connection DC+ thereof, is connected to the power converter via the windings W1 to W3. The windings W1 to W3 are connected to an alternating current side of the power converter SR, and the energy storage unit ES is connected to a direct current side of the power converter SR. The energy storage unit ES is connected, in particular, to a direct current side of the power converter SR, which direct current side comprises a ground potential and a positive potential P.

The power converter SR comprises a plurality of full bridges with high-side switches 11 to 13 and low-side switches 21 to 23. In each case a high-side switch and a low-side switch are connected in series, wherein the connecting point offers an alternating current connection A1 to A3. The alternating current connections A1 to A3 can also be referred to as phase connections of the power converter SR. Antiparallel diodes 1 to 6 are connected in parallel with each switch 11 to 23. If one of the switches 11 to 23 is actuated according to a closed switching state, the direction of flow of the current is opposed to the forward direction of the associated diode 1 to 6.

If the power converter SR is equipped by means of MOSFETs or IGBTs, the diodes 1 to 6 are the inverse diodes or body diodes which are an inherent part of the respective semiconductor switch. The diodes 1-6 can also be diodes which are connected in an antiparallel arrangement with respect to the switches 11-23 and which are embodied as an independent component. A combination of inverse diodes and diodes as an independent component is also possible. An example of a diode as an independent component is illustrated as diode 1' (with dashed lines). The latter is connected in an antiparallel arrangement with respect to the switch. In other words, the diode 1' (and also the diodes 1-6) has a flow direction which points toward the positive potential P of the power converter (or the direct current side of the power converter SR).

In the FIGURE, each switch 11 to 23 comprises a control connection (characterized by an arrow which is directed toward the respective switch. It is illustrated symbolically that a power converter controller C2 is connected individually to these switches. This is to be represented by the double arrow which starts from the power converter controller C2 and points toward the switches 11-23 or their control connections.

If the windings W1 to W3 are to be actuated to generate a rotating field (and therefore to rotate the motor), the switches 11 to 23 generate, actuated by the power converter controller C2, a multi-phase alternating voltage from the direct voltage of the energy store (provided by ground and the positive potential P), which alternating voltage is fed to the windings W1 to W3. As a result, the windings W1 to W3 generate a rotating field, with the result that the electric machine rotates.

The windings W1 to W3 are also connected to one another via delta switch group D1 to D3. If the switches D1, D2, D3 of the delta switch group D1 to D3 are closed, the windings W1 to W3 are connected to one another in a three-phase delta circuit.

In addition, there is an illustration of a star switch group S1, S2 by means of which the windings W1 to W3 can be connected to one another at one end in each case, in order to thereby form a common star point.

A configuration controller C1 is provided which is connected in an actuating fashion to the switch groups D1 to D3 and S1, S2.

In a driving state, either all the switches of the delta switch group D1-D3 are closed and the switches of the star switch group S1, S2 are opened, or all the switches of the delta switch group D1-D3 are actuated in the open state, and the switches S1, S2 of the star switch group are (all) closed. In addition, it is also possible to provide within the driving state an open-circuit state which provides that all switches of all the switch groups D1-D3 and S1, S2 are opened.

If energy is to be transmitted via the DC external connection provided by the positive connection DC+ and the ground connection DC−, for example the switch D1 is closed (by the configuration controller C1) and all the other switches D2, D3, S1, S2 remain open. Then, current can flow via the connection between DC+ and via the switch D1 to the alternating current connection A1 and from there via the diode 1 and/or via the diode 1' to the energy storage unit ES, in order to charge it. In a complementary fashion, energy can be transmitted from the energy storage unit ES to the DC external connection via the diode 1 (and/or diode 1'), the alternating current connection A1 and the switch D2.

A further possibility is to provide the switches D1, S2 and D3 closed in the energy transmission state, while the other switches of the switch groups are opened. In this case, energy can flow from the positive connection DC+ to the energy storage unit ES, on one hand via the switch D1 and the alternating current connection as well as via the diode 1 (or diode 1'), and in addition energy can be transmitted in parallel with this via the switch S2 as well as via the switch D3 (which are in series in this case) to the alternating current connection A3 and from there to the energy storage unit ES via the diode 3. As mentioned, energy can also flow in the reverse direction, for example in order to feed back energy from the vehicle.

Furthermore, it is possible for all the switches of the delta switch group (switches D1 to D3) and all the star switch group (switches S1, S2) to be closed in the energy transmission state, with the result that there are three paths: a first path to the energy storage unit from the connection DC+ via the switch D1, the alternating current connection A1 and the diode 1, a second path to the energy storage unit ES via the switch S2, the switch D3, the alternating current connection A3 via the diode D3, and a third path to the alternating current connection A2 via the switch S2, the switch S1 and the switch S2, and via the diode 3 to the energy storage unit ES. Diodes can be connected as an independent component (in an antiparallel arrangement) in parallel with the switches of the power converter SR via which current flows in the energy transmission state. This relates to the switch 11, the switches 11 and 13 or the switches 11, 12 and 13. By means of the connected diodes, the current carrying capacity can be increased in comparison with the case in which only the inverse diode or inverse diodes conduct current in the energy transmission state.

In other words, switches D1-D3 are for the configuration of the windings W1-W3 in a delta configuration (and if appropriate also in a star configuration, cf. switches S1, S2) in the driving state, wherein at least one of the switches D1, D2 and/or D3 which define this (delta) configuration is used to bypass the windings W1, W-2 and/or W3, with the result that electrical energy can flow between the DC external connection and the energy storage unit (via at least one diode of the power converter SR). The delta switch group is also used to bypass at least one winding if energy is to be transmitted between the energy storage unit and the DC external connection.

In addition, the FIGURE illustrates an AC external connection AC, via which, for example, current can be fed in an energy transmission state, and can be transmitted via the switch D1 (closed in this case), via the switch D2 (closed in this case) and/or via the switch D3 (closed in this case). If energy is transmitted via the AC external connection, the switches S1 and S2 are preferably opened. If energy is transmitted via the AC external connection in only a single phase, at least one switch of the star switch group S1, S2 can be closed. In an alternative embodiment, all the switches of all the switch groups are opened if in an energy transmission state alternating current is to be transmitted via the AC external connection.

There can be provision that a transmission of energy via the AC external connection AC and a transmission of energy via the DC external connection DC+, DC- are mutually exclusive. The energy transmission state can therefore comprise two states (which are usually mutually exclusive), specifically a DC energy transmission state and an AC energy transmission state. In the DC transmission state, energy is exchanged between the DC external connection and the energy storage unit ES, in particular via at least one of the switches of the delta switch group and, if appropriate, also via one switch of the star switch group as well as via at least one diode of the power converter SR. The diode can be part of a switch of the power converter. In addition, it is possible to provide a diode which is connected to the respective switch, cf. diode 1'. In an AC energy transmission state, energy can be transmitted between the AC external connection and the energy storage unit ES, and in this context, in particular, via the windings W1, W2 and W3 (preferably with the star switch group S1, S2 opened here). In this context, in addition the energy is transmitted via the power converter SR, in particular via its switches 11 to 23. If, at the same time, the delta switch group is closed, the windings W1 to W3 are bypassed in the AC energy transmission state. If these are opened, the energy flows through at least one of the windings W1 to W3, which in this case can implement a filter effect.

A superordinate controller (not illustrated) which is connected in an actuating fashion to the controllers C1 and C2 can be provided. In the travel state, this superordinate controller can actuate the switches of each full wave bridge (of the power converter SR) alternately, in particular according to a pulse modulation method, and can be configured to open all the switches 11 to 23 if an energy transmission state is present. As mentioned, the superordinate controller can also actuate the configuration controller C1, with the result that, depending on the desired configuration or when a bypass is desired (during an energy transmission state) said configuration controller C1 actuates the switch groups D1 to D3 and S1, S2 as described above.

While the switches 11-23 of the power converter SR are preferably switched off for switching frequencies above one kilohertz (preferably above 10 or 20 kilohertz), the switches D1 to D3 and S1, S2 can be configured for significantly lower switching frequencies, in particular for significantly fewer switching cycles during the service life than the switches 11 to 23 in comparison. Therefore, electromechanical switches are also possible for the switches D1 to D3 and S1, S2. In contrast, the switches 11 to 23 are preferably formed by a transistor which can be embodied as the inverse diodes 1 to 6. In parallel with the diode 1, 2 or 3, the diodes 1 and 3, the diodes 2 and 3, the diodes 1 and 2 or the diodes 1, 2 and 3, in each case one (further) diode, such as the diode 1' can be connected in order to increase the current carrying capacity. The further diode 1' is connected in parallel with the (inverse) diode 1 and is connected in an antiparallel arrangement with respect to the switch 11. The flow direction of the diode or of the diodes points toward the positive potential P of the power converter SR.

As result of the fact that at least one of the switches D1 to D3 bypasses at least one of the windings W1 to W3, very high charging power levels can be achieved, in particular also by virtue of the fact that the line through the power converter is provided by an element whose switching state is not changed during the transmission of energy. This relates, in particular, to the diode 1 or the diode 1' which does not have to be configured according to a switching current but instead only has to be continuously conductive for the transmission of energy in the energy transmission state. This can also relate to the diodes 2 and/or 3 if D1 is not closed, or not only D1 is closed in the energy transmission state. Therefore, the maximum current carrying capacity (higher in comparison with the switching current) of the diode is relevant here.

As mentioned, transistors which have an inverse diode can be used as switches of the power converter SR or as switches of the full bridge circuit formed there (with multiple phases). In order to increase the current carrying capacity, an additional diode such as the diode 1' can be connected in parallel with at least one of the inverse diodes. Said additional diode does not disrupt the operation of the power converter as an inverter (in the driving state), since in this state it usually does not conduct and increases the maximum transmissible power in the energy transmission state. All the switches can be configured with an additional diode as a discrete component (with the direction of flow as illustrated in the FIGURE), only the high-side switch of the power converter can be equipped with such an additional discrete diode, or only those high-side switches via which the configuration controller D1 also allows current to flow (by actuating the respective switch) can be equipped with an additional discrete diode.

In other words, in this way a diode can at least be connected as a discrete component in an antiparallel arrangement to a switch of the power converter. This is the case, in particular, if no components which have an inverse diode are used as switches, but also for the case in which switching elements are used which have an inverse diode, an (additional) discrete diode 1' which is connected in an antiparallel arrangement and is connected to the respective switch.

LIST OF REFERENCE SYMBOLS

A1-A3 Alternating current connections of the power converter SR
AC External connection
DC+, DC− Positive or negative connection of a DC external connection
C1 Configuration controller
C2 Power converter controller
D1-D3 Switches of a delta switch group or delta switch group
ES Energy storage unit
P Positive potential or positive connection of the power converter
S1, S2 Star switch group or switches of the star switch group
SR Power converter configured, in particular as an inverter, preferably as a B6C bridge and, in particular, as a full-wave bridge circuit
W1-W3 Windings of an electric machine
T Positive connection of the power converter (on a direct current side of the power converter)
1-6 Inverse diode
1' Additional diode as a further component

The invention claimed is:

1. A motor vehicle on-board power system comprising:
a power converter with a ground connection;
an electric machine having windings connected to alternating current connections of the power converter;
a delta switch group via which the windings are connected in a delta configuration;
a DC external connection which is connected to the ground connection and to at least one of the alternating current connections via at least one switch of the delta switch group, the at least one switch of the delta switch group being connected in parallel to at least one of the electric machine windings; and
a configuration controller which is connected in an actuating fashion to the delta switch group and is configured to:
actuate the delta switch group in a closed state or an open state when the vehicle on-board power system is in a driving state, and
actuate the at least one switch of the delta switch group in the closed state when energy is transmitted via the DC external connection, the energy transmitted via the DC external connection bypassing the at last one electric machine winding via the at least one switch of the delta switch group to charge the vehicle on-board power system.

2. The motor vehicle on-board power system as claimed in claim 1, further comprising a power converter controller which is connected in an actuating fashion to switches of the power converter and is configured to actuate the switches of the power converter to generate a rotating field in the windings when the motor vehicle on-board power system is in the driving state, wherein the power converter controller is also configured to actuate all the switches of the power converter in the open state when energy is transmitted via the DC external connection.

3. The motor vehicle on-board power system as claimed in claim 1, further comprising an AC external connection which is connected to the alternating current connections of the power converter via the windings, wherein the configuration controller is configured to actuate the delta switch group when energy is transmitted via the AC external connection.

4. The motor vehicle on-board power system as claimed in claim 1, further comprising an energy storage unit which is connected to the ground connection and to a DC supply potential of the power converter.

5. A method for operating a motor vehicle on-board power system which comprises windings of an electric machine connected to alternating current connections of a power converter with a ground connection, a delta switch group via which the windings are connected in a delta configuration, a DC external connection which is connected to the ground connection and to at least one of the alternating current connections via at least one switch of the delta switch group, the at least one switch of the delta switch group being connected in parallel to at least one of the electric machine windings, and a configuration controller which is connected in an actuating fashion to the delta switch group, the method comprising:
actuating, by the configuration controller, the delta switch group in a closed state or an open state when the vehicle on-board power system is in a driving state; and
actuating, by the configuration controller, the at least one switch of the delta switch group in the closed state when energy is transmitted via the DC external connection, the energy transmitted via the DC external connection bypassing the at last one electric machine winding via the at least one switch of the delta switch group to charge the vehicle on-board power system.

6. The method as claimed in claim 5, wherein in the driving state of the on-board power system the windings of the electric machine are operated either by the delta switch group in the delta configuration or are operated by a star switch group in a star configuration.

7. The method as claimed in claim 6, wherein in the DC energy transmission state electrical energy is transmitted between the DC external connection and the energy storage unit via at least one switch of the delta switch group, via at least one switch of the star switch group and via the power converter.

8. The method as claimed in claim 5, wherein when the energy is transmitted via the DC external connection, the energy is transmitted by a current which is above the maximum switching current of the power converter.

9. The method as claimed in claim 5, wherein when the energy is transmitted via the DC external connection, all the switches of the power converter are opened, and the energy is transmitted via at least one inverse diode of a switch of the power converter or via at least one diode which is connected in an antiparallel arrangement with respect to a switch.

10. The method as claimed in claim 5, wherein during operation of the electric machine according to a setpoint torque above a predetermined torque threshold value and according to a setpoint rotational speed below a predetermined rotational speed threshold value the windings of the electric machine are operated in a star configuration, and during operation of the electric machine according to a setpoint rotational speed above the rotational speed threshold value the windings of the electric machine are operated by the delta switch group in the delta configuration.

11. The method as claimed in claim 5, wherein in an AC energy transmission state electrical energy is transmitted between an AC external connection and an energy storage unit of the motor vehicle on-board power system via the windings of the electric machine and via the power converter, wherein in the AC energy transmission state a star switch group which is configured to connect the windings in a star configuration is opened and the delta switch group is opened.

12. The motor vehicle on-board power system as claimed in claim 2, further comprising an AC external connection which is connected to the alternating current connections of the power converter via the windings, wherein the configuration controller is configured to actuate the delta switch group when energy is transmitted via the AC external connection.

* * * * *